J. F. DANIELS, DEC'D.
C. W. DANIELS, ADMINISTRATOR.
CAST-OFF DEVICE.
APPLICATION FILED MAR. 22, 1916.

1,234,531.

Patented July 24, 1917.

Inventor:
John F. Daniels,
by Roberts, Roberts & Cushman
Attorneys.

UNITED STATES PATENT OFFICE.

JOHN F. DANIELS, OF PROVIDENCE, RHODE ISLAND, ASSIGNOR OF ONE-HALF TO RALPH M. WHITMAN, OF PROVIDENCE, RHODE ISLAND; CHRISTOPHER W. DANIELS ADMINISTRATOR OF SAID JOHN F. DANIELS, DECEASED.

CAST-OFF DEVICE.

1,234,531. Specification of Letters Patent. Patented July 24, 1917.

Application filed March 22, 1916. Serial No. 85,985.

*To all whom it may concern:*

Be it known that I, JOHN F. DANIELS, a citizen of the United States, and resident of Providence, in the county of Providence and State of Rhode Island, have invented new and useful Improvements in Cast-Off Devices, of which the following is a specification.

This invention relates to a separable supporting device, commonly called a cast-off device, by which a clasp or other fastening means is detachably suspended from a strap of webbing or the like. While the invention is applicable to clasps of various sorts, and may be used in garters, suspenders, etc., I have herein shown it for the purposes of illustration applied to a garter clasp of the kind set forth in Letters Patent of the United States granted to me, No. 1,147,147, and dated July 20, 1915.

In the accompanying drawings which illustrate one embodiment of the invention,—

Figure 4:
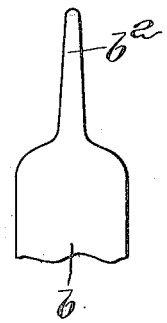
Fig. 4 is a plan view of the end of a blank from which the cast-off hook is formed.

The cast-off device as a whole comprises the two separable parts, namely, a supporting member and the cast-off hook. The supporting member $a$, having a slot or other suitable means for attaching the same to the webbing or strap, is provided with a bail $a'$ to which the cast-off hook is attached. The cast-off hook, carrying a clasp or the like C, comprises the shank $b$, the bent over hook portion $b'$, and the tongue portion $b^2$ bent inwardly from the end of the hook portion to a position between the hook portion and the shank. Said parts are integrally made of a piece of stiffly resilient sheet metal, preferably of the shape shown in Fig. 4, wherein the tongue portion $b^2$ is tapered and very substantially narrower than the body of the shank and hook portions.

Figure 1:
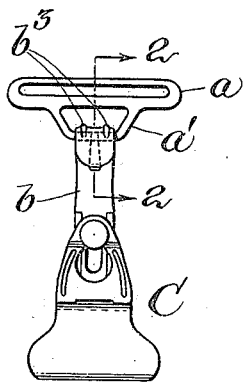
Figure 1 is a face view of the cast-off device used in connection with said garter clasp.
Figure 2:
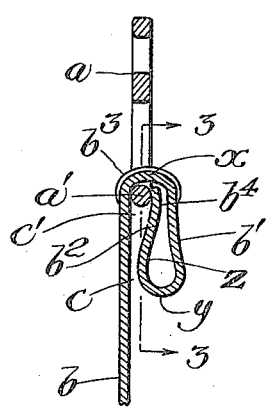
Fig. 2 is an enlarged detail view in section on line 2—2 of Fig. 1.
Figure 3:
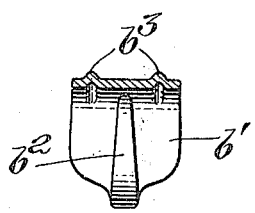
Fig. 3 is a section on line 3—3 of Fig. 2.

The loop formed by the inwardly bent tongue $b^2$ is widest near the extremity of the hook portion, as best shown in Fig. 2, and converges toward the end of the tongue portion. The tongue, for a greater part of its length, converges toward the hook portion, but adjacent its free end or extremity, it is curved slightly out of line with the remaining portion in a direction away from the hook portion, as at $b^4$. Thus, the side of the loop near the closed end of the loop is in close proximity to the shank $b$, while the free end of the tongue $b^2$ is in close proximity to the hook portion, thus providing a narrow entrance throat $c$ between the inner side of the loop and the shank, and an enlarged inner space $c'$ between the tongue and the shank, within which the supporting bail $a'$ is lodged with substantial freedom of movement. The tongue extends into close proximity to the bend of the hook portion, terminating nearer the bend of the hook portion than the diameter of the bail $a'$, so that when lodged within the hook the bail $a'$ can by no possibility pass behind the tongue $b^2$.

The cast-off hook being made of stiffly resilient metal, the hook portion and the tongue portion act as a combination of springs. In operation, when the supporting bail $a'$ is passed through the narrow throat $c$, the hook will yield at three points, namely, the bend $x$ of the hook portion, the bend $y$ between the hook portion and the tongue portion, and the curve $z$ of the tongue portion.

In order to stiffen the bend $x$ of the hook portion which has to receive the greatest strain, I prefer to upset two ribs or corrugations $b^3$ which need extend only over the curve of the bend.

The above described form of cast-off hook not only furnishes a hump or detent at the point $z$ which will yield readily by reason of the multiple spring action, but the hook itself terminates in the smooth, blunt, rounded end $y$ which effectually prevents the hook end from catching in the garments of the wearer.

I claim:

A cast-off hook comprising a shank, a bent over hook portion, and a tongue portion bent inwardly from the end of the hook portion between the hook portion and the shank, the sides of the loop so formed being widest apart near the end of the hook portion to provide a narrow entrance throat between the hook portion and the shank and converging toward the end of the tongue portion to provide an enlarged inner space, said tongue portion having its free end curved slightly out of line with the remaining portion of the tongue in a direction toward the shank.

Signed by me at Providence, Rhode Island, this 20th day of March, 1916.

JOHN F. DANIELS.

Witnesses:
JOHN F. CONATY,
JOHN J. DALY.